(12) United States Patent
Yonemoto (10) Patent No.: US 6,441,851 B1
(45) Date of Patent: Aug. 27, 2002

(54) SOLID STATE IMAGE PICKUP DEVICE, SIGNAL PROCESSING METHOD AND CAMERA THEREFOR

(75) Inventor: Kazuya Yonemoto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/941,058

(22) Filed: Sep. 30, 1997

(30) Foreign Application Priority Data

Oct. 2, 1996 (JP) .............................................. 8-261501

(51) Int. Cl.⁷ .............................................. H04N 5/335
(52) U.S. Cl. ....................................... 348/294; 348/297
(58) Field of Search ................................ 348/294, 296, 348/297, 298, 299, 302, 308, 249, 300

(56) References Cited

U.S. PATENT DOCUMENTS

| | | | | |
|---|---|---|---|---|
| 4,010,319 A | * | 3/1977 | Levine | 348/249 |
| 4,677,490 A | * | 6/1987 | Levine | 348/250 |
| 4,821,103 A | * | 4/1989 | Busby | 348/298 |
| 4,864,407 A | * | 9/1989 | Mulder | 348/249 |
| 5,264,944 A | * | 11/1993 | Takemura | 348/224 |
| 5,572,256 A | * | 11/1996 | Egawa et al. | 348/296 |
| 5,739,562 A | * | 4/1998 | Ackland et al. | 257/291 |
| 5,821,998 A | * | 10/1998 | Murakami et al. | 348/300 |
| 5,892,540 A | * | 4/1999 | Kozlowski et al. | 348/308 |

FOREIGN PATENT DOCUMENTS

JP          06-113207    *  4/1994  .......... H04N/5/335

\* cited by examiner

*Primary Examiner*—Wendy R. Garber
*Assistant Examiner*—Aung S. Moe
(74) *Attorney, Agent, or Firm*—Sonnenschein, Nath & Rosenthal

(57) ABSTRACT

A solid state image pickup device comprises a solid state image pickup element for sequentially outputting a plurality of signals of different sizes for the same pixel from the same output terminal and a signal processor for sampling and outputting the plurality of signals sequentially outputted from the solid state image pickup element so that a long accumulation time signal and a sum signal of the long accumulation time signal and a short accumulation time signal can be outputted in an alternative fashion by applying sampling pulses of different phases to sampling circuits connected to the CCD solid state image pickup element.

17 Claims, 10 Drawing Sheets

SOLID STATE IMAGE PICKUP DEVICE, SIGNAL PROCESSING METHOD AND CAMERA THEREFOR

BACKGROUND OF THE INVENTION

The present invention relates to a solid state image pickup device, signal processing method and camera therefor and more particularly relates to a solid state image pickup device, signal processing method and camera therefor employing a wide dynamic range Charge Coupled Device (hereinafter referred to as "CCD") solid state image pickup element.

With usual CCD solid state image pickup elements, since the signal output becomes constant after a signal charge obtained by performing photoelectric conversions at each pixel overflows the pixel, no signal output can be obtained for amounts of further incident light and dynamic range with respect to incident light is therefore narrow. In response to this, there is well known a solid state image pickup element that achieves a broader dynamic range by obtaining a signal charge of a long accumulation time and a signal charge of a short accumulation time for the same pixel and sequentially outputting a signal based on the signal charge accumulated over a long period of time and an addition signal obtained by adding the signal charges accumulated over a long period of time and a short period of time, with the addition signal being utilized when there are large amounts of incident light.

With the aforementioned wide dynamic range CCD solid state image pickup element, a single sampler is provided at the following stage. One of either a long accumulation time signal or a signal that is the sum of the long accumulation time signal and the short accumulation time signal are then sampled by this sampler. This means that only either the long accumulation time signal or the signal that is the sum of the long accumulation time signal and the short accumulation time signal can be outputted and that these signals cannot be outputted at the same time.

As the present invention sets out to resolve the aforementioned problems, it is the object of the present invention to provide a solid state image pickup device, signal processing method and camera thereof where required signals can be arbitrarily extracted without having to change the configuration or operation of the solid state image pickup element at all when using the solid state image pickup element to sequentially output from the same output terminal a plurality of signals of different sized for the same pixel.

SUMMARY OF THE INVENTION

In order to resolve the aforementioned problems, the solid state image pickup device of the present invention comprises a solid state image pickup element and a signal processor. The solid state image pickup element is for sequentially outputting a plurality of signals of different sizes for the pixel from the output terminal. The signal processor is for sampling and outputting the plurality of signals sequentially outputted from the solid state image pickup element.

Further, a signal processing method for a solid state image pickup device employing a solid state image pickup element for sequentially outputting a plurality of signals of different sizes for the pixel from the output terminal comprises a step of sampling and outputting the plurality of signals sequentially outputted from the solid state image pickup element.

Moreover, camera comprises a solid state image pickup element, an optical system and a signal processor. The solid state image pickup element is for sequentially outputting from the output terminal a plurality of signals of different sizes for a pixel. The optical system is for guiding light from an object to a light receiving surface of the solid state image pickup element. The signal processor is for sampling and outputting the plurality of signals sequentially outputted from the solid state image pickup element.

DETAILED DESCRIPTION OF THE PREFERRED EMBODIMENTS

First Embodiment

The following is a detailed description with reference to the drawings of an embodiment of the present invention.

Figure 1:
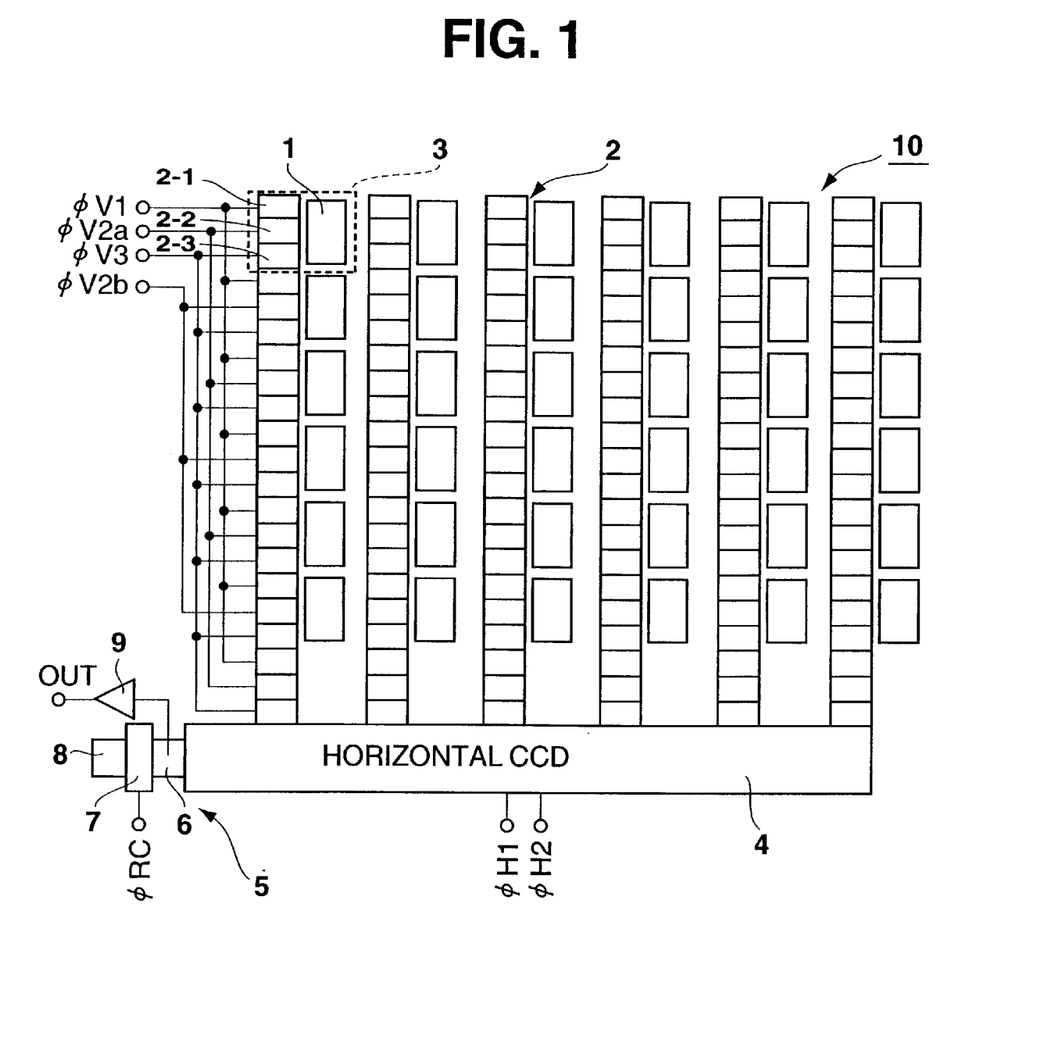
FIG. 1 is a schematic block diagram of an interline method transfer method CCD solid state image pickup element.

FIG. 1 is a schematic block diagram showing an example of a wide dynamic range Charge Coupled Device (CCD) solid state image pickup element. In FIG. 1, incident light is changed to signal charges of amounts corresponding to the amount of light that is accumulated at a sensor 1 comprising a plurality of photodiodes arranged in a matrix in columns (vertical direction) and rows (horizontal direction), with a vertical CCD 2 being provided for these sensors 1 each column.

The vertical CCD 2 is of, for example, a three-layer electrode, three-phase drive configuration. Namely, three transfer electrodes 2-1 to 2-3 of a three layer structure arranged so as to be repeated in order in the vertical transfer direction are grouped together. Signal charge read from the sensors 1 can then be three-phase driven so as to be vertically transferred by applying vertical transfer clocks $\phi V1$ to $\phi V3$ to the transfer electrodes 2-1 to 2-3. A pixel element 3 is then configured from one sensor 1 and one group of transfer electrodes 2-1 to 2-3 corresponding to the sensor 1 of the vertical CCD 2.

At the vertical CCD 2, for example, of the three transfer electrodes 2-1 to 2-3, the transfer electrode 2-2 to which the second vertical transfer clock φV2 is applied also doubles as a read gate electrode for reading signal charge from the sensor 1. The second vertical phase transfer clock φV2 can therefore have three values of a low level (hereinafter referred to as an "L level"), a middle level (hereinafter referred to as an "M level") and a high level (hereinafter referred to as an "H level").

Namely, the third value pulse of the second vertical transfer clock φV2 becomes a read pulse and the lower potential of the transfer electrode 2-2 can then be searched for by applying this read pulse to the second electrode 2-2. The signal charge from the sensor 1 to the lower part of this transfer electrode 2-2 can then be read. Further, as the reading of odd numbered rows of unit pixels 3o and even numbered rows of unit pixels 3e is controlled independently, vertical transfer clocks φV2a and φV2b are applied separately at the transfer electrodes 2-2 to odd numbered rows and even numbered rows.

A horizontal CCD 4 is provided along the direction of arraying (horizontal direction) of the vertical CCDs 2 and the lower side of the vertical CCDs 2 of FIG. 1. The horizontal CCD 4 is provided with a two stage transfer electrode per one horizontal pixel. By then applying horizontal transfer clocks φH1 and φH2 to these transfer electrodes, a signal charge corresponding to one line (one horizontal scanning line) shifted from the vertical CCD 2 is two phase driven so as to be horizontally transferred in order.

A load detector 5 of, for example, a floating diffusion configuration is provided at a terminal part of the horizontal CCD 4 for detecting signal charges transferred by the horizontal CCD 4 and converting these signal charges to voltage signals. The load detector 5 comprises a floating diffuser 6 injected with signal charge from the horizontal CCD 4, a reset gate 7 applied with a reset pulse φRG and a reset drain 8 for disposing of charge via the reset gate 7. At the floating diffuser 6 of the load detector 5, the signal voltage obtained by converting from a signal charge is externally extracted as a CCD output OUT via an output circuit 9 comprising a source follower etc. In the above way, an interline transfer method CCD solid state image pickup element 10 is formed. As the dynamic range for this CCD solid state image pickup element 10 is wide with respect to inputted light, long time period accumulation and short time period accumulation can be carried out at one sensor 1. In the following, signal charge accumulated over a long period of time is referred to as long accumulation time signal and signal charge accumulated over a short period of time is referred to as short accumulation time signal.

Figure 2:
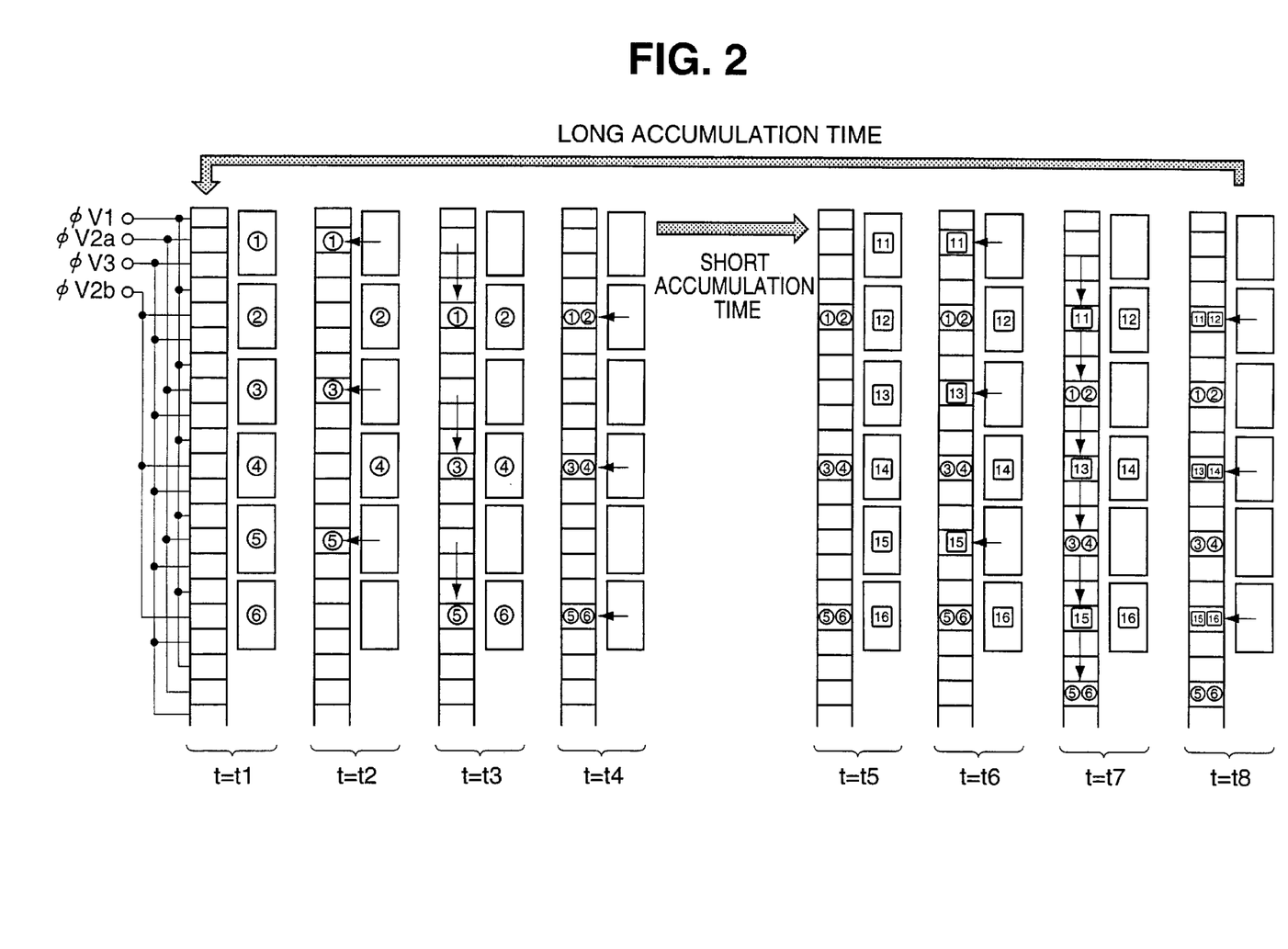
FIG. 2 is a conceptual view of the operation of reading a long accumulation time signal and a short accumulation time signal.
Figure 3:
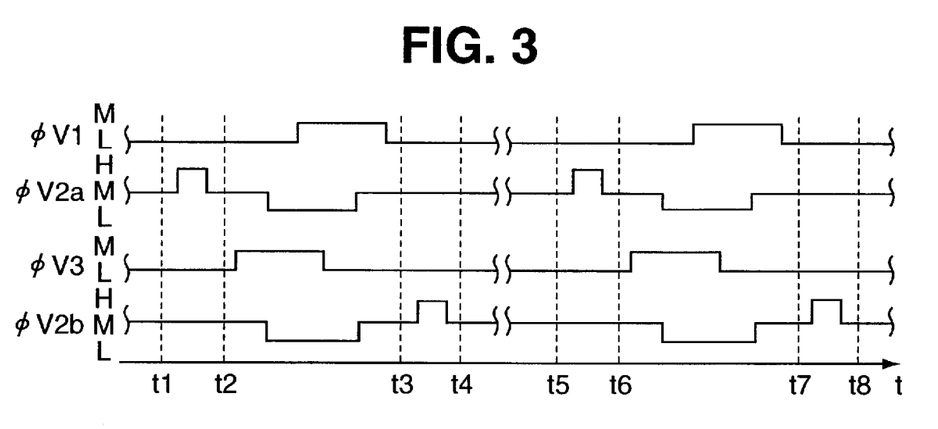
FIG. 3 is a timing chart for the time of the operation of reading the long accumulation time and short accumulation time signals.

A description will now be given in accordance with the timing chart of FIG. 3 and with reference to the conceptual diagram of FIG. 2 of the operation of reading the long accumulation time signals and the short accumulation time signals. FIG. 2 is a view showing the conditions for reading long accumulation time signals and short accumulation time signals for the vertical CCD of a certain column.

First, with t=t1, the vertical transfer clocks φV1 and φV3 at "L" levels and the vertical transfer clocks φV2a and φV2b at "M" levels, photoelectrically converted signal charges ①, ②, ... ⑥ accumulated over a long period of time are accumulated at the sensors 1. From these accumulation conditions, signal charges ①, ③, ⑤ accumulated at odd numbered columns of sensors 1 are read out (t=t2) to the vertical CCD 2 on the rise of a read pulse for which the second phase vertical transfer clock φV2a for odd numbered columns becomes an "H" level.

Then, in order to perform a field read, the signal charges ①, ③, ⑤ are transferred to even numbered columns of pixels (t=t3) by third phase driving in the line shift period. Signal loads ②, ④ and ⑥ accumulated over a long period of time at the sensors 1 of even numbered columns are then read to the vertical CCD 2 on the rise of a read pulse for which the second phase vertical transfer clock φV2b for even columns becomes a high level to be mixed (t=t4) with the signal charges ①, ③, ⑤ read the previous time. Signal loads ((①+②), (③+④), (⑤+⑥)) accumulated over long periods of time for which field reads have been carried out at positions of pixels for even numbered rows are therefore accumulated.

After this, a short period of time passes and photoelectrically converted signal charges [11], [12], . . . , [16] (shown in FIG. 2 as numerals enclosed by squares) accumulated over this short period of time are accumulated at the sensor 1 (t=t5). From these accumulation conditions, signal charges [11], [13] and [15] are read to the vertical CCD 2 (t=t6) on the rising edge of the read out pulse for which the second phase vertical transfer clock φV2a for odd numbered rows is a "H" level. Then, in order to carry out a field read, the signal charges [11], [13] and [15] are transferred to even numbered columns of pixels (t=t7) via three phase driving in the line shift period.

Next, signal charges [12], [14] and [16] accumulated at even numbered columns of sensors 1 over a short period of time are read to the vertical CCD 2 on the read pulse for which the second phase vertical transfer clock φV2b for even numbered columns is a high level and are mixed with the signal charges [11], [13] and [15] read the previous time (t=t8). As a result, signal charges ((①+②), (③+④), (⑤+⑥)) accumulated over long periods of time for which field reads have been carried out at positions of pixels for even numbered rows and signal charges ([11]+[12], [13]+[14], [15]+[16]) accumulated over short periods of time for which field reads at positions of even numbered rows of pixels have been carried out can be accumulated.

Via this operation, a state is realized where signal charges ((①+②), (③+④), (⑤+⑥)) accumulated over long periods of time and signal charges ([11]+[12], [13]+[14], [15]+[16]) accumulated over short periods of time are placed alternately within the vertical CCD 2 by field reading that mixes signal charges for two pixels of odd and even numbered columns that are neighboring in the vertical direction. An image signal is then usually obtained from these signal charges during an long accumulation time, i.e. a vertical image period by carrying out vertical transfer using the vertical CCD 2 and horizontal transfer using the horizontal CCD 4.

Figure 4:
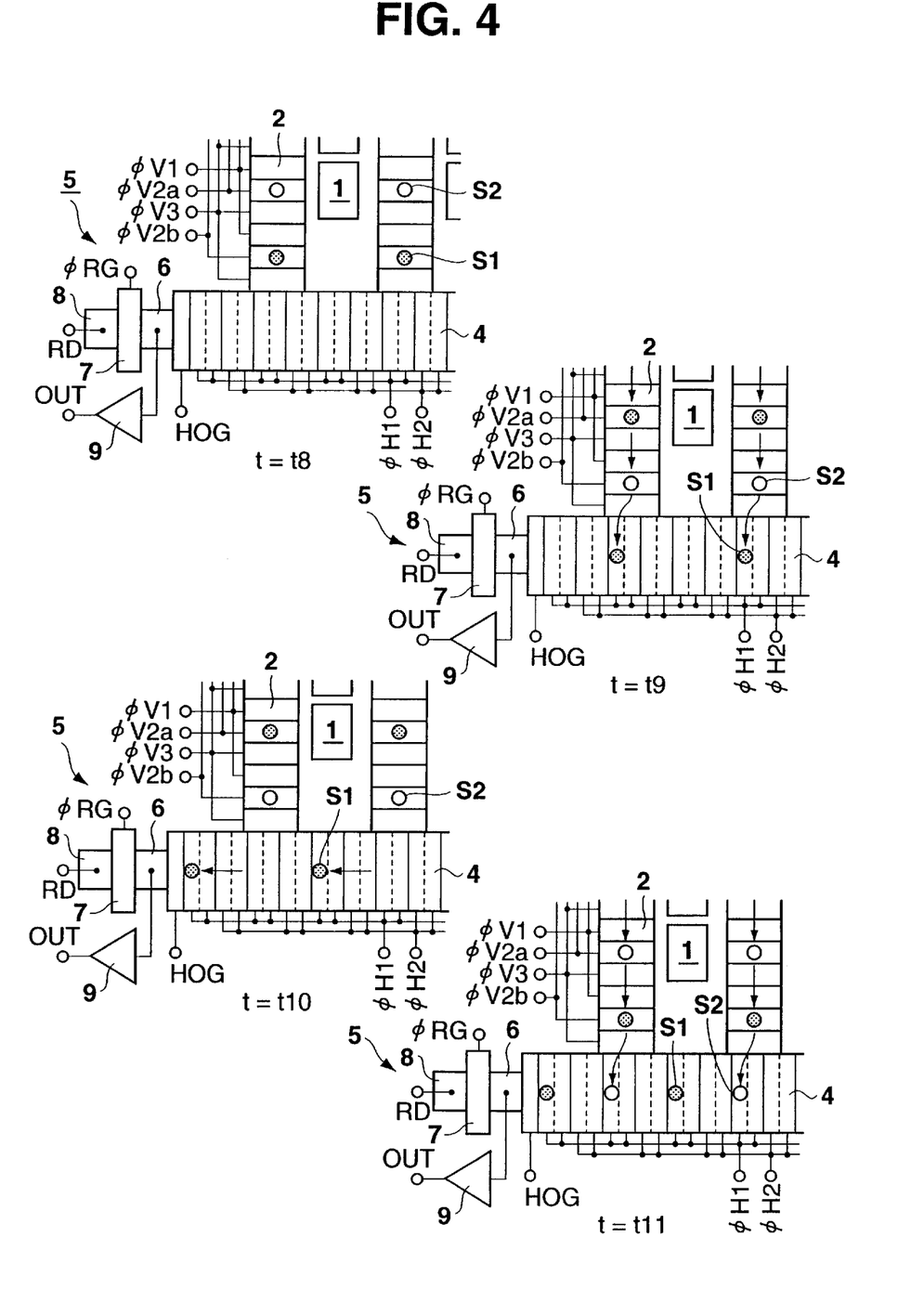
FIG. 4 is a conceptual view of the horizontal transfer operation for the long accumulation time and short accumulation time signals.
Figure 5:
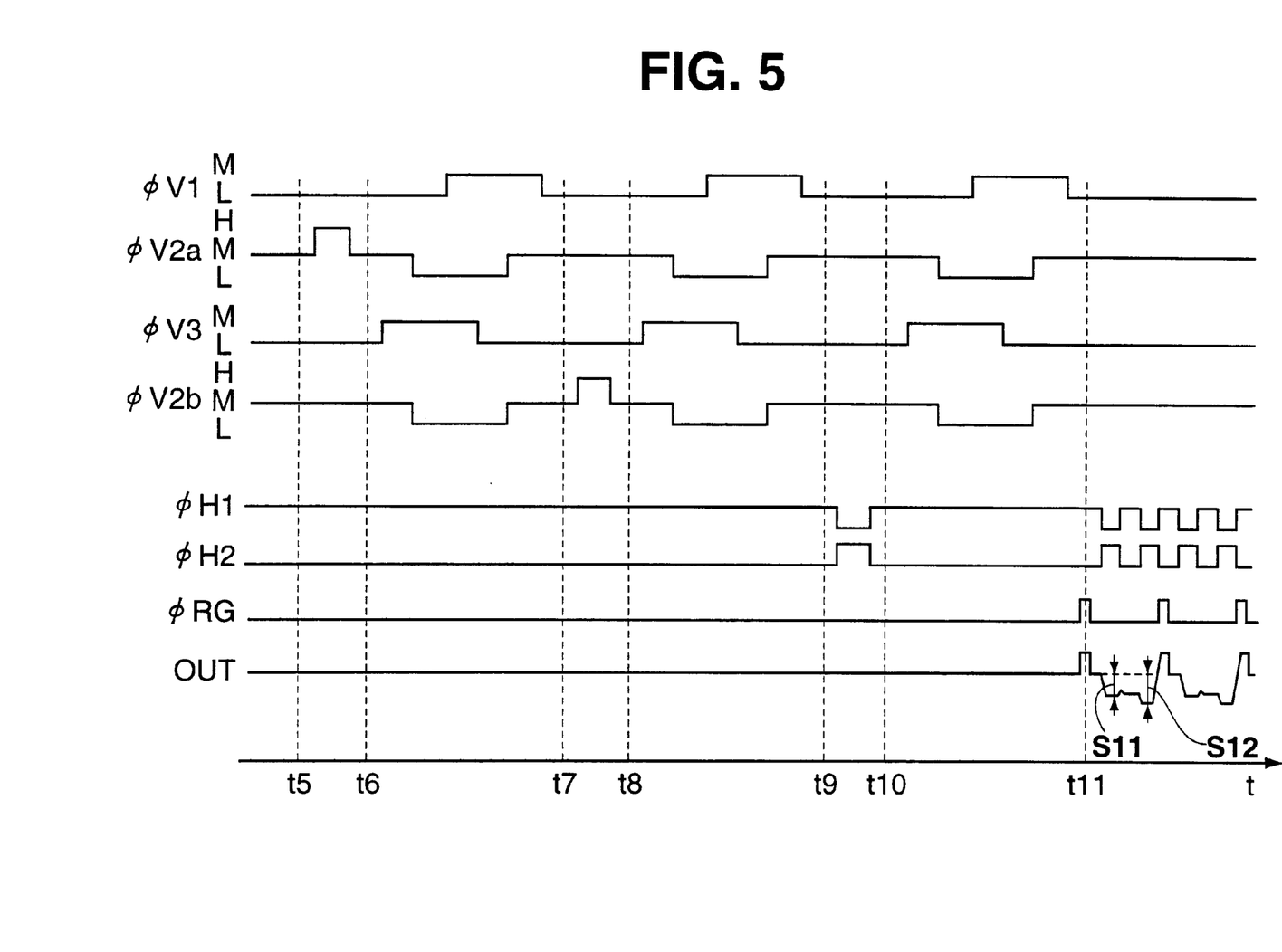
FIG. 5 is a timing chart for the time of the horizontal transfer operation for the long accumulation time and short accumulation time signals.

Next, the conditions for alternately outputting long accumulation time signal charges and short accumulation time signal charges from the floating diffuser 6 by shifting these signal charges to the horizontal CCD 4 and performing a sequential horizontal transfer under the conditions shown by t=t8 of FIG. 2, i.e. from the conditions where long accumulation time signal charges and short accumulation time signal charges are placed alternately within the vertical CCD are described with reference to the conceptual drawing of FIG. 4 and the timing chart of FIG. 5. FIG. 4 is a view showing the details of the vicinity of the horizontal CCD 4 and the floating diffuser 6. In FIG. 4, signal charges of a long accumulation time are shown as S1 and signal charges of a short accumulation time are shown as S2.

The long accumulation time signal charge S1 is accumulated at the bottom of the transfer electrode 2-2 to which the second phase vertical transfer clock φV2b of the vertical CCD 2 is applied (t=t8) and is then transferred from this accumulated state to a storage part of an electrode φH1 of the horizontal CCD 4. Next, the long accumulation time signal charge S1 transferred to the horizontal CCD 4 is transferred along just one stage of the horizontal CCD 4 (t=t10) and the short accumulation time signal charge S2 from the same pixel is then also transferred to the horizontal CCD 4 (t=t11).

As a result of this, the long accumulation time signal charge S1 and the short accumulation time signal charge S2 belonging to the same pixel column become lined up next to each other within the horizontal CCD 4. These signal charges are then horizontally transferred within the horizontal picture period, the long accumulation time signal charge S1 and the short accumulation time signal charge S2 belonging to the same pixel are transferred to the floating diffuser 6, and a reset pulse ORG is applied to the reset gate 7.

In other words, the reset pulse φRG for resetting the floating diffuser 6 is generated at half the frequency, i.e. twice the period of the horizontal transfer clocks φH1 and φH2 of the horizontal CCD 4. In this way, two signals of a long accumulation time signal S11 and a signal S12 that is the sum of the long accumulation time and short accumulation time signals can be alternately outputted during the reset pulse φRG.

Figure 6:
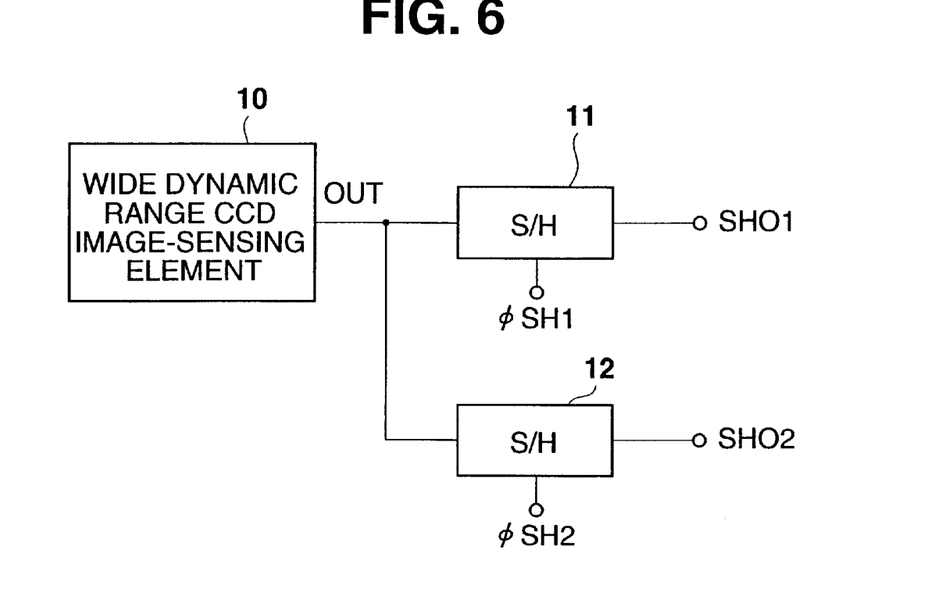
FIG. 6 is a block diagram showing a first embodiment of the present invention.

FIG. 6 is a block view showing a first embodiment of the present invention to which the aforementioned wide dynamic range CCD solid state image pickup element 10 is applied. In FIG. 6, two sampling (sampling) circuits 11 and 12 are connected to an output terminal of the wide dynamic range CCD solid state image pickup element 10 that alternately outputs the two signals of the long accumulation time signal and the signal that is the sum of the long accumulation time and short accumulation time signals. Sampling pulses φSH1 and φSH2 of differing phases are then applied to these two sampling circuits 11 and 12 so that the sampling circuits 11 and 12 output separate sampling outputs SH01 and SH02.

Figure 7:
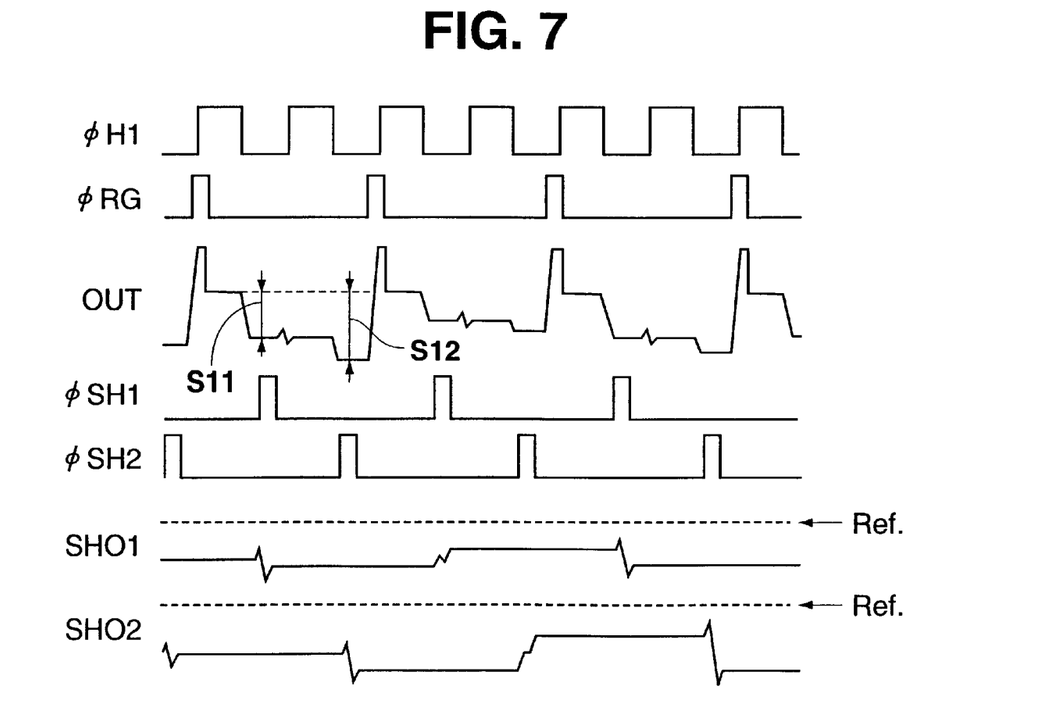
FIG. 7 is a timing waveform diagram relating to the first embodiment.

FIG. 7 shows the timing waveforms for the CCD output OUT of the CCD solid state image pickup element 10, the sampling pulses φSH1 and φSH2, and the sampling outputs SH01 and SH02. The phase of the sampling output SH01 is adjusted to the long accumulation time signal S11 of the CCD output OUT of the CCD solid state image pickup element 10. In this way, just the long accumulation time is waveform shaped and outputted from the sampling circuit 11 as a sampling output SH01.

On the other hand, the phase of the sampling output SH02 is adjusted to the signal S12 that is the sum of the long accumulation time and short accumulation time signals for the CCD output OUT of the CCD solid state image pickup element 10. Just the signal that is the sum of the long accumulation time signal and the short accumulation time signal is then waveform shaped and outputted from the sampling circuit 12 as the sampling output SH02. The long accumulation time signal and the signal that is the sum of the long accumulation time signal and the short accumulation time signal outputted alternately from the CCD solid state image pickup element 10 are therefore separated by the separate sampling circuits 11 and 12.

In the above way, by connecting two sampling circuits 11 and 12 to the output terminal of the CCD solid state imaging element 10 alternately outputting two signals of a long accumulation time signal and a signal that is the sum of the long accumulation time signal and the short time accumulation signal and applying sampling pulses fSH1 and fSH2 of differing phases to these sampling circuits 11 and 12, a long accumulation time signal and a signal that is the sum of the long accumulation time signal and a short accumulation time signal can be separately and simultaneously outputted without changing sampling timing etc.

Second Embodiment

Figure 8:
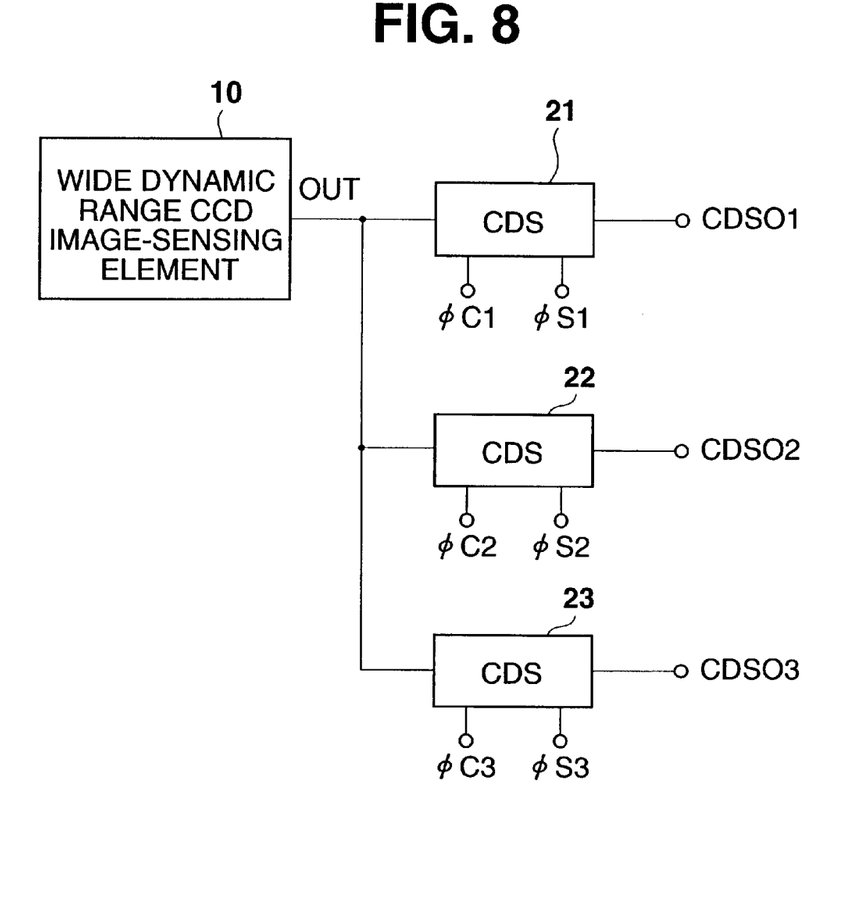
FIG. 8 is a block diagram showing a second embodiment of the present invention.

FIG. 8 is a block diagram showing a second embodiment of the present invention to which the wide dynamic range CCD solid state image pickup element 10 is applied. In FIG. 8, three Correlation Double Sampling (hereinafter referred to as "CDS") circuits 21, 22 and 23 are connected to the output terminal of the CCD solid state image pickup element 10. Clamp pulses φC1, φC2 and φC3 and sampling pulses φS1, φS2 and φS3 are then applied to the three CDS circuits 21, 22 and 23. In this way, separate sampling outputs SH01 and SH02 are outputted from the sampling circuits 11 and 12.

Figure 9:
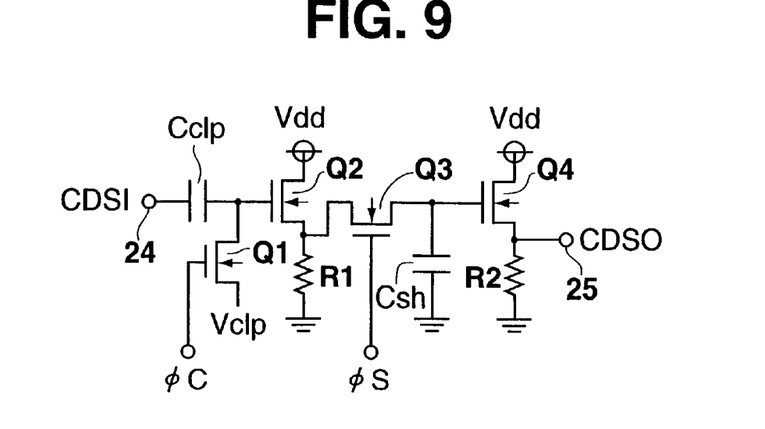
FIG. 9 is a circuit diagram showing an example circuit configuration for a CDS circuit.

There are several possibilities for the circuit configuration of the CDS circuits 21, 22 and 23 but in this case, it is taken that, as an example, the circuit configuration shown in FIG. 9 is used. In FIG. 9, one end of a clamp capacitor Cclp is connected to a circuit input terminal 24 to which an input signal CDSI is applied. The remaining end of the clamp capacitor Cclp is then connected to the drain of an N-channel MOS transistor Q1 and the gate of an N-channel MOS transistor Q2.

A clamp pulse φC and a clamp voltage Vclp are applied to the gate and source, respectively, of the MOS transistor Q1. A power supply Vdd is connected to the drain of the MOS transistor Q2, with the source of MOS transistor Q2 being connected to earth via a resistor R1. The drain of an N channel MOS transistor Q3 is then connected to the source of the MOS transistor Q2 and a sampling pulse φS is applied to the gate of this MOS transistor Q3.

One end of a sampling capacitor Csh and the gate of an N channel MOS transistor Q4 are connected to the source of the MOS transistor Q3, with the remaining end of the sampling capacitor being connected to earth. The drain of the MOS transistor Q4 is connected to the power supply Vdd and the source is connected to earth via a resistor R2. An output signal CDSO is then taken from the source of the MOS transistor Q4 via a circuit output terminal 25.

Figure 10:
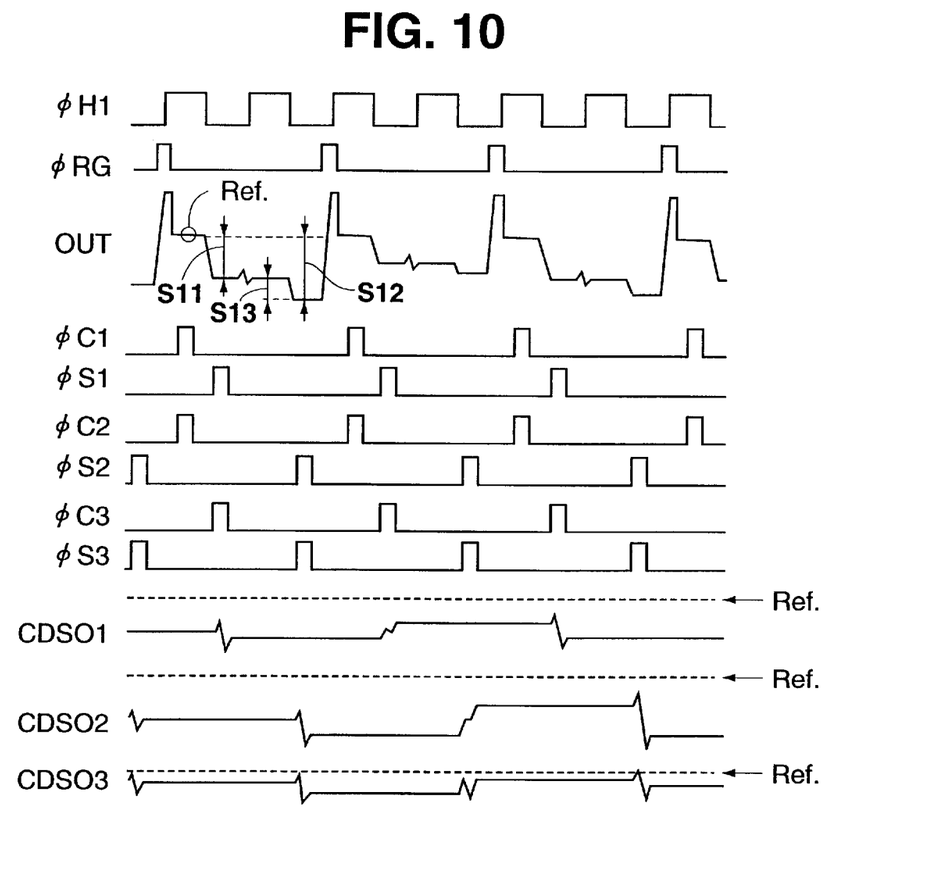
FIG. 10 is a timing waveform diagram relating to the second embodiment.

FIG. 10 shows the timing waveforms for the CCD output OUT of the CCD solid state image pickup element 10, the clamp pulses φC1, φC2 and φC3, the sampling pulses φS1, φS2 and φS3 and the CDS outputs CDS01, CDS02 and CDS03. The circuit operation of the solid state image pickup device relating to the second embodiment will now be described with reference to the timing waveforms of FIG. 10. First, at the CDS circuit 21, a reference level Ref. of the CCD output OUT of the CCD solid state image pickup element is clamped using the clamp pulse φC1 and the long accumulation time signal S11 is outputted as the CDS output CDS01 by sampling using the sampling pulse φS1.

At the CDS circuit 22, the reference level Ref. of the CCD output OUT is clamped by the clamp pulse φC2 and the signal S12 that is the sum of the long accumulation time and short accumulation time signals is outputted as the CDS output CDS02 by sampling using the sampling pulse φS2. At the CDS circuit 23, the reference level Ref. of the CCD output OUT is clamped using the clamp pulse φC3 and the short accumulation time signal S13 is outputted as the CDS output CDS03 by sampling using the sampling pulse φS3.

By connecting three CDS circuits 21, 22 and 23 to the output terminal of a CCD solid state image pickup element 10 that alternately outputs the two signals of the long accumulation time signal and the signal that is the sum of the long accumulation time and short accumulation time signals and applying clamp pulses φC1, φC2 and φC3 and sampling pulses φS1, φS2 and φS3 of a prescribed phase relationship to the CDS circuits 21, 22 and 23, the long accumulation time signal S11, the signal S12 that is the sum of the long accumulation time and short accumulation time signals and the short accumulation time signal S13 can be separately and simultaneously outputted without changing sampling timing etc.

Third Embodiment

Figure 11:
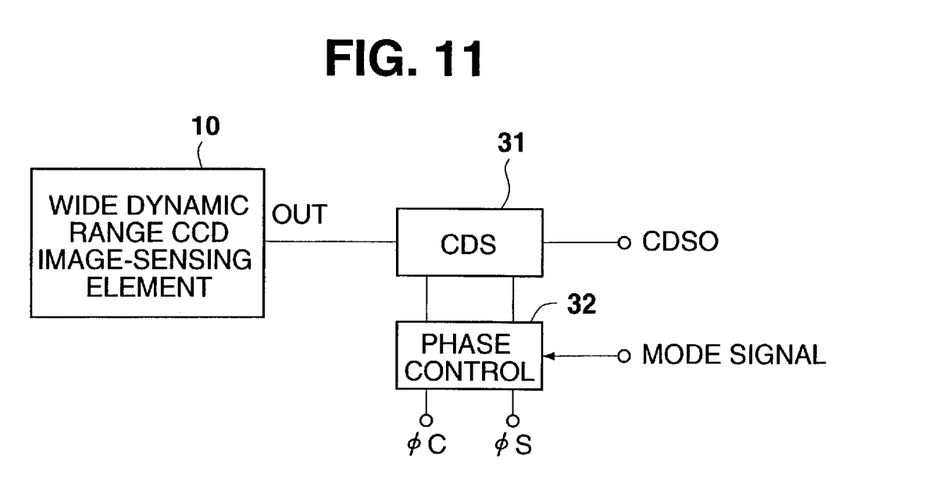
FIG. 11 is a block diagram showing a third embodiment of the present invention.

FIG. 11 is a block diagram showing a third embodiment of the present invention. In FIG. 11, just one CDS circuit 31 is connected to the output terminal of the CCD solid state image pickup element 10. A clamp pulse φC and a sampling pulse φS controlled to be of appropriate phases in response to a mode signal provided externally at a phase control circuit 32 are then applied to the CDS circuit 31. A circuit configuration such as, for example, that shown in FIG. 9 can be used as the CDS circuit 31.

Figure 12:
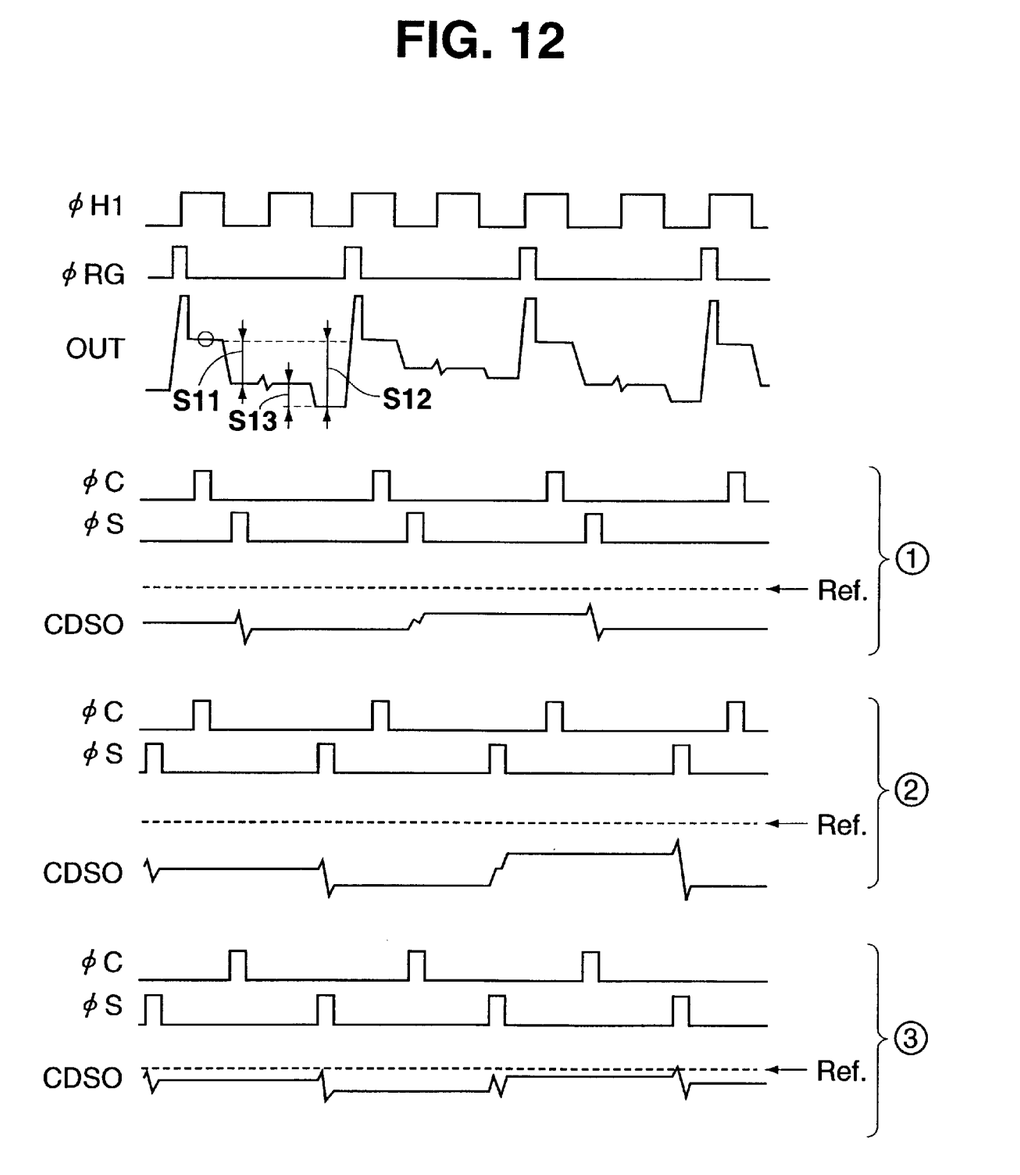
FIG. 12 is a timing waveform diagram relating to the third embodiment.

FIG. 12 shows the timing waveforms for the CCD output OUT, clamp pulses φC for each mode ①, ② and ③, a sampling pulse φS and a CDS output CDS. A description will now be given with reference to the timings of FIG. 12 of the circuit operation of the solid state image pickup device relating to the third embodiment. First, in the case of mode ①, the long accumulation time signal S11 is obtained as the CDS output CDSO by having the phase of the clamp pulse φC align with the reference level of the CCD output OUT and by having the phase of the sampling pulse φS align with the long accumulation time signal S11.

In the case of mode ②, the phase of the clamp pulse φC is aligned with the reference level of the CCD output OUT and the phase of the sampling pulse φS is aligned with the signal S12 that is the sum of the long accumulation time and short accumulation time signals so as to obtain the signal S12 that is the sum of the long accumulation time and short accumulation time signals as the CDS output CDSO. In the case of mode ③, the phase of the clamp pulse φC is aligned to the short accumulation time signal S11 and the phase of the sampling pulse φS is aligned to the signal S12 that is the sum of the long accumulation time and short accumulation time signals so as to obtain the short time accumulation signal S13 as the CDS output CDSO.

As described above, by connecting a single CDS circuit 31 to the output of the CCD solid state image pickup element 10 that alternately outputs two signals of the long accumulation time signal and the signal that is the sum of the long accumulation time and short accumulation time signals and appropriately changing the phase of a clamp pulse φC and a sampling pulse φS that are applied to this CDS circuit 31, any one of the long time accumulation signal S11, the signal S12 that is the sum of the long accumulation time and short accumulation time signals and the short time accumulation signal S13 can be selectively outputted under the phase control of the clamp pulse φC and the sampling pulse φS without changing the operation timing or the circuit configuration of the CCD solid state image pickup element 10.

In each of the above embodiments, a description was given of an example where a combination of a long accumulation time signal and a short accumulation time signal were searched for as large signals and small signals obtained from the same pixel. However, this does not by any means have to be a combination of the same kind of signal components. For example, it would also be possible to take a combination where a signal component obtained by reading a usual signal is taken to be the large signal and a smear component obtained by vertical transfer under conditions where a signal charge is not read (empty packet) is taken as the small signal. According to this combination, since the smear component can then be independently extracted, the smear component can be reduced by carrying out processing to subtract the extracted smear component from the signal component.

Figure 13:
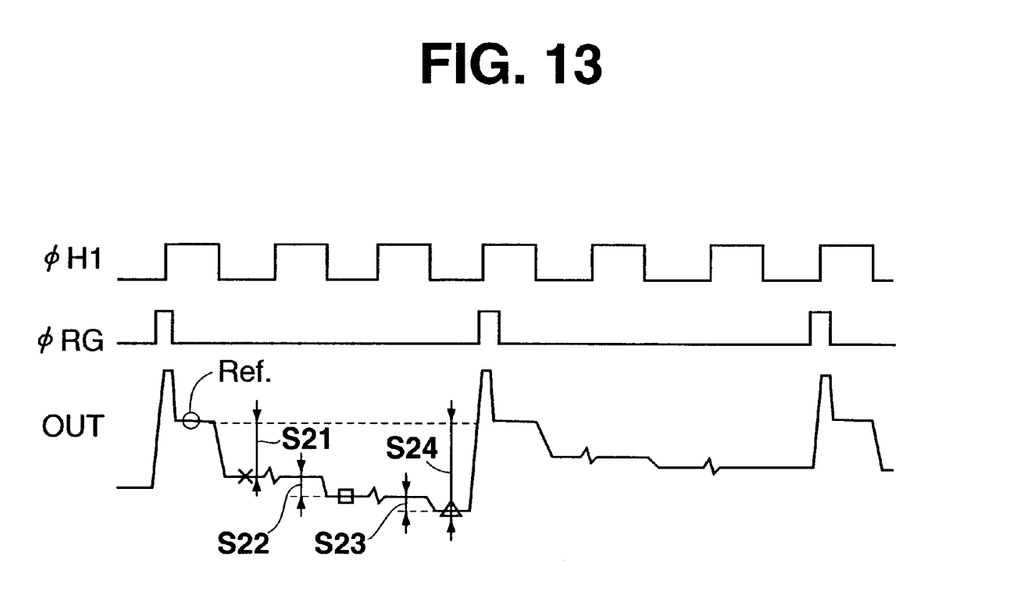
FIG. 13 is a timing waveform diagram relating to an example modification of the present invention.

Further, in the above embodiments a plurality of different sized signals obtained from the same pixel was taken to be two signals of a large signal, the "long accumulation time signal" and a small signal, the "short accumulation time signal". However, this is by no means limited to two signals, with three signals or more of differing sizes also being possible. FIG. 13 shows the timing waveform for the CCD output OUT in the case of adopting, for example, three signals, a large, medium and small signal, of differing accumulation times. In FIG. 13, the mark × shows the long accumulation time signal, the mark □ shows a signal that is the sum of the long accumulation time signal and an intermediate accumulation time signal, and the mark Æ shows a signal that is the sum of the long accumulation, middle accumulation and short accumulation times signals.

In this way, when there are three signals as the plurality of signals of different sizes obtained from the same pixel, for example, in FIG. 8, four CDS circuits are connected to the output terminal of the CCD solid state image pickup element 10, with clamp pulses φC1, φC2, φC3 and φC4, and sampling pulses φS1, φS2, φS3 and φS4 being applied to these CDS circuits. The long accumulation time signal, middle accumulation time signal, short accumulation time signal and addition signals thereof can then be outputted by appropriately setting the timing relationships between each of the clamp pulses φC1 to φC4 and sampling pulses φS1 to φS4.

Namely, in FIG. 13, the reference level Ref. of the CCD output OUT is clamped using the clamp pulse φC1 and a long accumulation time signal S21 is obtained by sampling the long accumulation time signal × using the sampling pulse φS1. Next, the long accumulation time signal × is clamped using the clamp pulse φC2 and a middle accumulation time signal S22 is obtained by sampling the signal □ that is the sum of the long accumulation time signal and the middle accumulation time signal using the sampling pulse φS2.

Next, the signal □ that is the sum of the long accumulation time signal and the middle accumulation time signal is clamped using the clamp pulse φC3 and a short accumulation time signal S23 is obtained by sampling the signal Æ that is the sum of the long accumulation time, middle accumulation time and short accumulation time signals using the sampling pulse φS3. The reference level Ref. for the CCD output OUT is then clamped using the clamp pulse φC4 and a signal S24 that is the sum of the long accumulation time, middle accumulation time and short accumulation time signals is obtained by sampling the signal Æ that is the sum of the long accumulation time, middle accumulation time and short accumulation time signals using the sampling pulse φS4.

Figure 14:
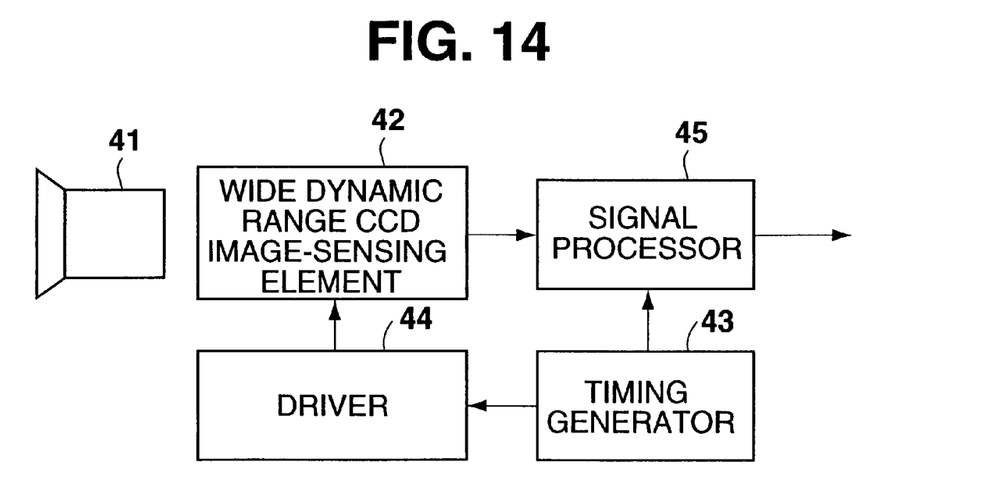
FIG. 14 is an outline view of a camera relating to the present invention.

FIG. 14 is an outline view of the configuration of a camera relating to the present invention. In FIG. 14, light from an object is guided to the light-receiving surface of a CCD solid state image pickup element 42 by an optical system including a lens 41 etc. The CCD solid state image pickup element 42 is configured with a wide dynamic range for outputting a plurality of signals of different sizes for the same pixel. Driving of this CCD solid state image pickup element 42 is carried out by a driver 44 based on various timing signals outputted from a timing generator 43.

A CCD output OUT of the CCD solid state image pickup element 42 is supplied to a signal processor 45 of the following stage. A circuit relating to the aforementioned first, second or third embodiments can be used as this signal processor 45. When a circuit relating to the first embodiment, i.e. two sampling circuits 11 and 12, are used as the signal processor 45 with the wide dynamic range CCD solid state image pickup element 42 alternately outputting two signals of a long accumulation time signal and a signal that is the sum of the long accumulation time signal and the short accumulation time signal, the long accumulation time signal and the signal that is the sum of the long accumulation time signal and the short accumulation time signal are separated and simultaneously outputted.

When a circuit relating to the second embodiment, i.e. the three CDS circuits 21, 22 and 23, are used as the signal processor 45, the long accumulation time signal, the signal that is the sum of the long accumulation time and short accumulation time signals and the short accumulation time signal can be separated and simultaneously outputted. Further, when a circuit relating to the third embodiment, i.e. the signal CDS circuit 31 is used as the signal processing circuit 45, either one of the long accumulation time signal, the signal that is the sum of the long accumulation time and short accumulation time signals and the short accumulation time signal can be selectively outputted.

According to the present invention, with a solid state image pickup device employing a solid state image pickup element sequentially outputting a plurality of signals of different sizes for the same pixel from the same output terminal, by sampling and outputting each of the plurality of signals outputted sequentially from the solid state image pickup element, arbitrary signals can be taken out using sampling timing or a plurality of sampling circuits without changing the configuration or operation of the solid state sensing elements at all.

What is claimed is:

1. A camera comprising:
    a solid state image pickup element for sequentially outputting from an output terminal a long accumulation time signal and a signal indicative of a sum of said long accumulation time signal and a short accumulation time signal for a pixel;
    an optical system for guiding light from an object to a light receiving surface of said solid state image pickup element; and
    a signal processor for sampling and outputting a first level between a reference level and a level of said long accumulation time signal, and a second level between said reference level and a level of said signal indicative of the sum of said long accumulation time signal and said short accumulation time signal, appearing between two adjacent reset pulses.

2. A solid state image pickup device comprising:
    a solid state image pickup element for generating, for a pixel, an output signal comprised of, in sequence, a long accumulation time signal and a signal representing a sum of a short accumulation time signal and said long accumulation time signal, said output signal also including a reference level; and
    a signal processor for sampling said output signal between two sequential reset pulses for generating a first sample corresponding to said long accumulation time signal, and for generating a second sample corresponding to said signal representing said sum of said short accumulation time signal and said long accumulation time signal, and for outputting two signals corresponding to said first sample and said second sample.

3. The solid state image pickup device of claim 2, wherein a reset pulse resets a load detector in said solid state image pickup element.

4. The solid state image pickup device of claim 2, wherein said signal processor comprises a single correlation double sampler for correlation double sampling each of said signals outputted from said solid state image pickup element and a phase controller for controlling the phase of a clamp pulse and a sampling pulse provided to said correlation double sampler.

5. The solid state image pickup device of claim 2, wherein a signal detector adds said long accumulation time signal and said short accumulation time signal for detecting signal charges and converting them into electrical signals.

6. The solid state image pickup device of claim 2, wherein said two signals comprise a signal component and a smear component obtained for said pixel.

7. A signal processing method, comprising the steps of:
    outputting from a solid state image pickup device, for a pixel, in sequence, a signal comprised of a long accumulation time signal and a signal representing a sum of said long accumulation time signal and a short accumulation time signal, said output signal also including a reference level;
    sampling said output signal between two sequential reset pulses for generating a first sample corresponding to said long accumulation time signal, and for generating a second sample corresponding to said signal representing said sum of said short accumulation time signal and said long accumulation time signal; and
    outputting two signals corresponding to said first sample and said second sample.

8. The method of claim 7, wherein said solid image pickup device employs a solid state image pickup element.

9. The method of claim 7, wherein the steps for sampling said output signal and outputting two signals are performed by a signal processor.

10. The method of claim 9, wherein said signal processor comprises a single correlation double sampler for correlation double sampling each of said signals outputted from said solid state image pickup device and a phase controller for controlling the phase of a clamp pulse and a sampling pulse provided to said correlation double sampler.

11. The method of claim 7, wherein a signal detector adds said long accumulation time signal and said short accumulation time signal for detecting signal charges and converting said signal charges into electrical signals.

12. The method of claim 7, wherein said output signals comprise a signal component and a smear component obtained for said pixel.

13. The method of claim 7, wherein a reset pulse resets a load detector in said solid state image pickup device.

14. A solid state image pickup device comprising:
    a wide dynamic range CCD solid state image pickup element for outputting a signal for a pixel, said output signal comprised of, in sequence, a long accumulation time signal and a signal representing a sum of a short time accumulation signal and said long time accumulation signal, said output signal also including a reference level; and
    a plurality of correlation double sampling circuits for sampling said output signal between two sequential reset pulses for generating a first sample corresponding to said long accumulation time signal and for generating a second sample corresponding to said signal representing a sum of said short accumulation time signal and said long accumulation time signal when a clamp pulse and a sampling pulse are applied to each correlation double sampling circuit respectively, wherein a first correlation double sampling circuit outputs a first CDS signal corresponding to said first sample, and a second correlation double sampling circuit outputs a second CDS signal corresponding to said second sample.

15. The solid state image pickup device of claim 14, wherein a reset pulse resets a load detector in said solid state image pickup element.

16. The solid state image pickup device of claim 14, wherein a signal detector adds said long accumulation time signal and said short accumulation time signal for detecting signal charges and converting them into electrical signals.

17. The solid state image pickup device of claim 14, wherein said first CDS signal and said second CDS signal comprise a signal component and a smear component obtained for said pixel.

* * * * *